United States Patent [19]

Mitchell

[11] 4,093,939
[45] June 6, 1978

[54] ACCESSORY FOR A VEHICLE FOR MONITORING ITS OPERATION AND THAT OF ITS DRIVE MEANS

[75] Inventor: Neville Herbert Mitchell, Johannesburg, South Africa

[73] Assignee: Transputer (Proprietary) Limited, Johannesburg, South Africa

[21] Appl. No.: 769,272

[22] Filed: Feb. 16, 1977

[30] Foreign Application Priority Data

Feb. 18, 1976 South Africa .................. 76/0973

[51] Int. Cl.² .............................................. G08B 19/00
[52] U.S. Cl. ................................... 340/52 F; 340/53;
340/62; 340/262; 340/263; 346/17; 180/106
[58] Field of Search ................. 340/52 F, 52 D, 53,
340/62, 262, 263, 264; 346/33 D, 16, 18, 17;
180/98, 105 E, 105 R, 106

[56] References Cited

U.S. PATENT DOCUMENTS 2,982,594  5/1961  Riegger et al. .................. 346/18
3,206,116  9/1965  Short ............................ 346/18 X Primary Examiner—Alvin H. Waring
Attorney, Agent, or Firm—Fitch, Even, Tabin & Luedeka

[57] ABSTRACT

The invention provides an accessory for a vehicle, the accessory having a sensor for sensing the acceleration of the vehicle, the speed of the vehicle or the operating speed of an engine of the vehicle, a first recorder for recording when any of these parameters is excessive, detectors for detecting whether the vehicle is in motion or the engine is in operation and a second recorder for recording the amount of time the vehicle is in motion or the engine is in operation. The accessory is electrically operable, the speed of the vehicle and of the engine being sensed by electro-magnetic devices in co-operation with magnetized elements whose speed of rotation is proportional to the speed of the vehicle or its engine. Conveniently, the acceleration of the vehicle is determined by differentiating a signal representative of the vehicle's speed. The accessory further includes a visual or aural alarm for warning a driver of the vehicle that an abuse condition has occurred or is about to occur.

7 Claims, 1 Drawing Figure

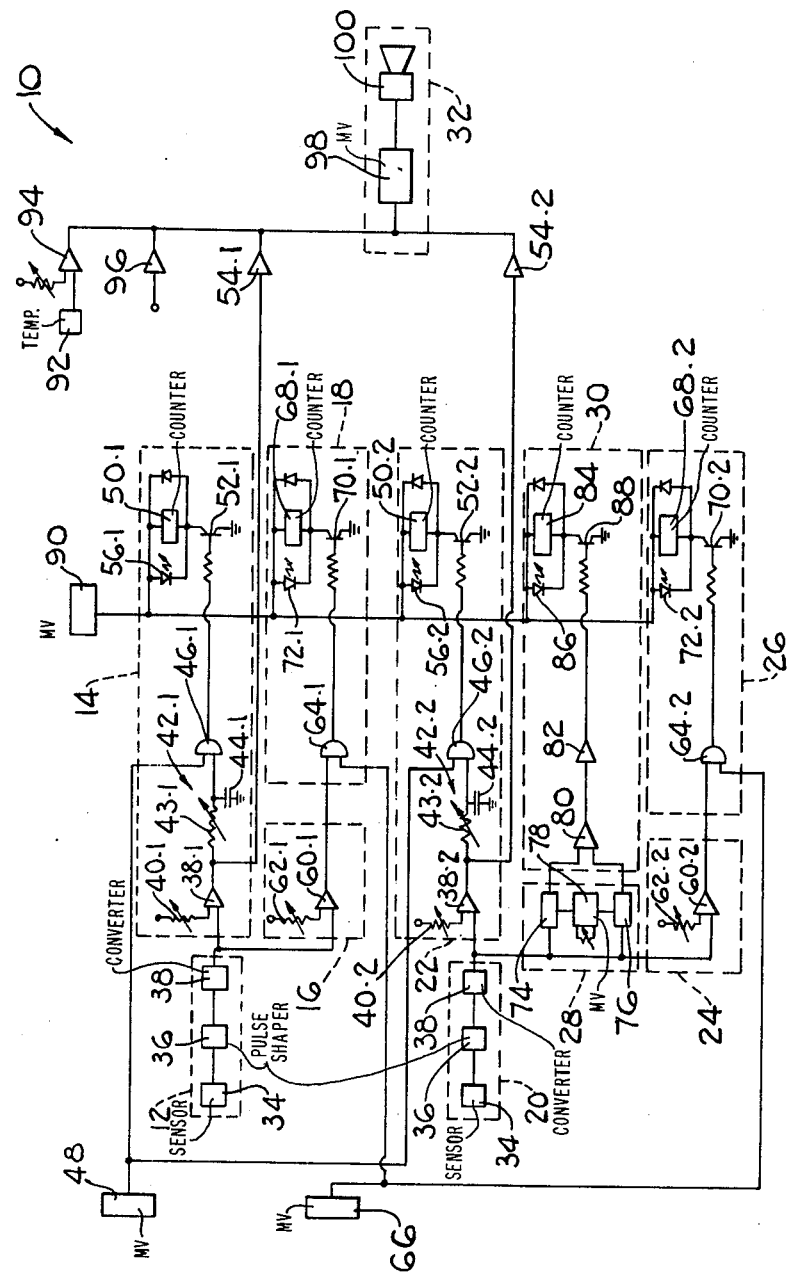

ACCESSORY FOR A VEHICLE FOR MONITORING ITS OPERATION AND THAT OF ITS DRIVE MEANS

FIELD OF THE INVENTION

This invention relates to an accessory for a vehicle. It relates in particular to an accessory for recording the number of times the vehicle has been abused or driven dangerously and the amount of time the vehicle has been in motion or its engine has been in operation.

BACKGROUND OF THE INVENTION

The applicant is aware of accessories for vehicles, primarily motor vehicles, which have an acceleration responsive element and a device for recording if the acceleration responsive element provides a signal indicating that the vehicle has been excessively accelerated. However, this figure on its own is of no real value, as over a period of a month or some other control period, the vehicle could have been utilised to a greater or lesser degree. Thus an indication is required of the amount of time the vehicle or its driving engine have been in operation. It is also desirable to know not only if the vehicle has been over-accelerated, but also if the engine has been over-revved or if the vehicle has been driven at an excessive speed, particularly in these days of fuel shortages and speed limits.

The applicant is further aware of devices which give a graphical indication of the speed of the vehicle versus time. It will be appreciated that such devices, due to the graphical result, are difficult to interpret and to obtain any meaningful information. Further, as such devices have to provide a graphical record over fairly lengthy periods, the graph is squashed, and it is accordingly not possible to ascertain if the speed of the vehicle has been varied rapidly in a short period of time. Further, if one wishes to determine the acceleration of the vehicle, to determine if the vehicle has been excessively accelerated, the slope of the graph at each point must be determined. This is extremely difficult, if not impossible, and extremely inaccurate.

It is thus an object of the invention to provide an accessory for a vehicle which detects and records abuse of the vehicle or its engine as well as the amount of time the vehicle or its engine have been operated.

It is further a object of the invention to provide such an accessory which provides the information in a concise, easily read manner that does not need to be excessively processed in order to provide a meaningful result.

It is a still further object of the invention to provide such an accessory which provides the driver of the vehicle with an indication that the vehicle or its engine has been, or is about to be, abused.

It is an alternative object of the invention to provide an accessory which first warns the driver that an abuse condition has occurred but only records the event if the driver has not taken corrective measures in a certain time period.

SUMMARY OF THE INVENTION

The invention accordingly provides an accessory for a vehicle having a drive means, the accessory including a sensing means for sensing at least one of the following abuse parameters: the acceleration of the vehicle, the speed of the vehicle, the operating speed of the drive means; and for providing an abuse signal representative thereof;

an abuse recording means responsive to the sensing means for recording when the abuse signal provided by the sensing means is different from a first predetermined value;

a detection means for detecting if at least one of the following operating conditions occurs: the drive means is in operation, the vehicle is in motion; and for providing an operating signal accordingly; and a time recording means responsive to the detection means.

In this specification, by "acceleration" is meant both positive and negative acceleration, i.e., both speeding up and slowing down.

The accessory may have three sensing means for sensing all three of the abuse parameters, with only one abuse recording means being provided. Alternatively, more than one abuse recording means may be provided for example three abuse recording means may be provided for separately recording over-acceleration of the vehicle, over-speeding of the vehicle and over-speeding of the drive means.

The abuse recording means may conveniently record the number of times the abuse signal exceeds in magnitude the first predetermined value. The time recording means may also be digitally operable, recording, for example, tenths of an hour.

The accessory may preferably be electrically operable. Thus the vehicle and drive means speed sensors may include electro-magnetically operable devices, such as coils, for detecting rotation of magnetized elements secured to rotating components of the vehicle and its drive means.

In a preferred embodiment, the accessory may also have visual or aural indicating means for indicating to a driver or operator of the vehicle that an abuse parameter has, or is about to, exceed the first predetermined value. Thus, if an abuse parameter exceeds a second predetermined value, slightly less than the first predetermined value, the indicating means may be enabled. Alternatively, an indication may first be given that an abuse parameter has exceeded the first predetermined value and the abuse recording means only operated after a certain time period if the driver has not taken appropriate corrective steps.

The accessory may further be in a tamper-proof housing that has mounting means for mounting it in the vehicle. A self-contained source of power may be provided or the accessory may be supplied with power bia suitable connecting means from a source of power forming part of the vehicle.

BRIEF DESCRIPTION OF THE DRAWINGS

The invention is described, by way of an example, with reference to the accompanying drawing, which shows a block diagram of an electrically operable embodiment of the invention.

DESCRIPTION OF A PREFERRED EMBODIMENT

Referring to the drawing, an accessory is shown generally, designated by the reference numeral 10. The accessory 10 is for detecting and recording if a vehicle or its engine (not shown) are abused by the driver or operator, and the amount of time the vehicle and its engine have been in operation.

The accessory 10 has an engine speed sensing means 12 for sensing the operating speed of the engine; an engine over-rev recording means 14 for recording if the engine is over-revved; an engine operating detection means 16 for detecting if the engine is in operation; an engine operating time recording means 18 for recording the amount of time the engine is in operation; a vehicle speed sensing means 20 for sensing the speed of the vehicle; a vehicle over-speed recording means 22 for recording if the vehicle is driven at an excessive speed; a vehicle operating detection means 24 for detecting if the vehicle is in motion; a vehicle operating time recording means 26 for recording the amount of time the vehicle is in motion; a differentiating means 28 for differentiating a speed signal provided by the vehicle speed sensing means 20 to provide a signal representative of the acceleration of the vehicle; an over-acceleration recording means 30 for recording if the vehicle is excessively accelerated; and an alarm means 32 for warning the driver of the vehicle that the engine has been over-revved, or that the vehicle has exceeded a predetermined speed limit, or that there is a malfunction of the engine.

Referring first to the engine and vehicle speed sensing means 12 and 20, they each comprise a sensor 34, a pulse shaping unit 36 and a frequency to voltage converter 38. The sensors 34 are coils that are suitably placed to be activated by magnets secured to components of the engine and the vehicle. For example, small bar magnets (not shown) may be adhesively secured to a crankshaft pulley of the engine and to a drive shaft forming part of the transmission system of the vehicle. As these magnets rotate past the respective coils, voltage pulses are induced therein, the frequency of the pulses being proportional to the speed of the engine or the vehicle. These voltage pulses are squared by the pulse shaping units 36, which may be Schmitt trigger units, and D.C. voltage signals are provided by the frequency to voltage converters, the magnitude of these signals being proportional to the speeds of the engine and the vehicle, respectively.

The engine over-rev recording means 14 and the vehicle over-speed recording means 22 are similar, and will be considered together, sub-reference "1" referring to the engine over-rev recording means 14 and sub-reference "2" referring to the vehicle over-speed recording means 20. Both of these means 14, 22 comprise a comparator 38.1, 38.2 supplied with a speed signal from the appropriate frequency to voltage converter 36 and with an adjustable reference signal via a suitable variable resistor 40.1, 40.2; a variable delay unit 42.1, 42.2 formed from a variable resistor 43.1, 43.2 and a capacitor 44.1, 44.2; a two input AND-gate 46.1, 46.2 supplied from the delay unit 42.1, 42.2 and from an astable multivibrator 48; and a counter 50.1, 50.2 driven by a drive transistor 52.1, 52.2 which is controlled by the AND-gate 46.1, 46.2. The variable resistors 40.1, 40.2 are adjusted so that if the speed signals provided by the frequency to voltage converters 36 exceed predetermined values, indicating that the engine and the vehicle have exceeded predetermined speed values, the comparators 38.1, 38.2 provide signals which after time delays of about 1 second enable the AND-gates 46.1, 46.2. The astable multivibrator 48 supplies pulses 1 second apart and of sufficient duration, about 100 milliseconds, to activate the counters 50.1, 50.2 which are of the electro-mechanical solenoid operated type. Thus, if the engine is over-revved, or if the vehicle exceeds the speed limit for more than 1 second a count is recorded on the counters 50.1, 50.2 every second.

The outputs of the comparators 38.1, 38.2 are connected to the alarm means 32 via suitable buffer units 54.1, 54.2. Thus, when the speeds of the engine or the vehicle exceed the predetermined values, an alarm is immediately given, providing the driver with an opportunity to decrease the speed of the engine or of the vehicle before a count is recorded on the counters 50.1, 50.2. A light emitting diode 56.1, 56.2 is also provided in parallel with each counter 50.1, 50.2, so that a visual indication is also provided when the counters register a count.

Similarly to the engine over-rev recording means 14 and the vehicle over-speed recording means 22, the engine operating detection means 16 and the engine operating time recording means 18 are similar to the vehicle operating detection means 24 and the vehicle operating time recording means 26. They will accordingly also be considered together, sub-reference "1" referring to the former and sub-reference "2" to the latter. Thus, the engine and vehicle operating detection means 16, 24 each comprise a comparator 60.1 60.2, supplied from the frequency to voltage converters 38 with speed signals, and with reference signals via variable resistors 62.1, 62.2. The reference signals are set at appropriately low values so that the comparators 60.1, 60.2 provide out-put signals if the speeds of the engine or the vehicle exceed low values. The time recording means 18, 26 comprise two input AND-gates 64.1, 64.2 supplied from the comparators 60.1, 60.2 and from an astable multivibrator 66; and counters 68.1, 68.2 driven by drive transistors 70.1, 70.2 and having light emitting diodes 72.1, 72.2. The counters 68.1, 68.2 are similar to the counters 50.1, 50.2 and the astable multivibrator 66 provides a 100 millisecond pulse every 6 seconds. Thus, the time recording means 18, 26 record in tenths of an hour the amount of time the engine or the vehicle are being operated.

The differentiating means 28 in turn comprises two sample-and-hold units 74, 76 supplied with a speed signal from the vehicle speed frequency to voltage converter 38, the sampling rate being determined by a variable astable multivibrator 78. The ouputs of the sample-and-hold units 74, 76 are compared by a comparator 80 forming part of the over-acceleration recording means 30. The over-acceleration recording means 30 also comprises a buffer unit 82 and a counter 84 and light emitting diode 86 driven by a drive transistor 88. The counter 84 is again similar to the counters 50.1, 50.2, 68.1, 68.2. The astable multivibrator 78 has a unity mark-to-space ratio with a period of about 200 milliseconds. Thus, if the speed of the vehicle varies sufficiently in a 100 millisecond period, implying a certain acceleration value, a count will be recorded on the counter 84. Thus, if the excessive acceleration is maintained a count will be recorded every 200 milliseconds. It will further be appreciated by those skilled in the art that both positive and negative excessive acceleration will be determined by the sample-and-hold units 76, 76 and the comparator 80.

The counters 50.1, 50.2 68.1 and 68.2 are supplied with power via a monostable multivibrator 90 which provides a negative pulse of a few seconds duration when energised. Thus the counters are only energised a few seconds after the accessory has been switched on. This is done as the accessory is supplied with electrical power from the vehicle's electrical system via an ignition switch of the vehicle, and spurious signals could cause the counters to register counts incorrectly when the engine is activated.

The accessory 10 is also provided with a negative temperature coefficient resistor 92 and a comparator 94 for detecting if the engine gets too hot, the comparator 94 being connected to the alarm means 32. The alarms means 32 is also connected to an oil pressure sensor of the engine (not shown) via a buffer unit 96. Thus an alarm is sounded if the engine malfunctions.

Finally the alarm means 32 comprises an astable multivibrator 98 driving a loudspeaker 100. Thus, by these means, an accessory for a vehicle is provided which indicates the extent to which the vehicle and its engine have been abused and in what operating period. The accessory also interacts with the driver of the vehicle to warn him of dangerous driving practices to try and get the driver to drive the vehicle in a safer, better manner.

I claim:

1. An accessory for a vehicle having a drive means, the accessory including
   - a vehicle speed sensing means for sensing the travelling speed of the vehicle and for providing a vehicle speed signal;
   - a differentiating means for differentiating the vehicle speed signal with respect to time to provide an acceleration signal representative of the linear acceleration of the vehicle;
   - a vehicle overspeed recording means responsive to the vehicle speed sensing means for recording the amount of time that the vehicle is driven at a speed greater than a predetermined speed;
   - a vehicle excessive acceleration recording means responsive to the differentiating means for recording the amount of time that the vehicle is accelerated at an acceleration greater than a predetermined value;
   - a vehicle operating time recording means responsive to the vehicle speed sensing means for recording the amount of time the vehicle is in motion;
   - a drive means operating speed sensing means for sensing the operating speed of the drive means and for providing a drive means speed signal;
   - a drive means overspeed recording means responsive to the drive means speed sensing means for recording the amount of time that the drive means is operated at a speed greater than a predetermined speed; and
   - a drive means operating time recording means responsive to the drive means speed sensing means for recording the amount of time the drive means is in operation.

2. An accessory as claimed in claim 1 which includes a vehicle overspeed indicating means responsive to the vehicle speed sensing means for indicating to an operator of the vehicle that the vehicle is being driven at a speed greater than a second predetermined speed, which is less than the said predetermined vehicle speed.

3. An accessory as claimed in claim 1, which includes a vehicle excessive acceleration indicating means responsive to the differentiating means for indicating to an operator of the vehicle that the vehicle is being accelerated at an acceleration greater than the predetermined value.

4. An accessory as claimed in claim 1 which includes a drive means overspeed indicating means responsive to the drive means speed sensing means for indicating to an operator of the vehicle that the drive means is being operated at a speed greater than a second predetermined speed, which is less than the said predetermined drive means speed.

5. An accessory as claimed in claim 1 in which the vehicle speed sensing means provides and electrical output signal and the differentiating means is electrically operable.

6. An accessory as claimed in claim 1 in which the vehicle overspeed recording means, the vehicle excessive acceleration recording means, the vehicle operating time recording means, the drive means overspeed recording means and the drive means operating time recording means are all electrically operable.

7. An accessory as claimed in claim 1 in which the vehicle overspeed recording means, the vehicle excessive acceleration recording means and the drive means overspeed recording means are digitally operable.

* * * * *